United States Patent [19]
Chiou

[11] Patent Number: 5,418,697
[45] Date of Patent: May 23, 1995

[54] SIGNAL LAMP ASSEMBLY FOR BICYCLES

[76] Inventor: Danny Chiou, 2F, No. 31, Alley 16, Lane 312, Ta-Tung Rd., Sec. 2, Hsi-Chih, Taiwan, Prov. of China

[21] Appl. No.: 306,440
[22] Filed: Sep. 19, 1994
[51] Int. Cl.$^6$ ................................................. B62J 6/00
[52] U.S. Cl. ........................................ 362/72; 362/78; 362/800; 362/802
[58] Field of Search .................. 362/72, 78, 277, 227, 362/249, 802, 800

[56] References Cited

U.S. PATENT DOCUMENTS

| | | | |
|---|---|---|---|
| 4,135,229 | 1/1979 | Modurkay | 362/72 |
| 4,763,230 | 8/1988 | Cummings et al. | 362/72 |
| 5,121,305 | 6/1992 | Deed et al. | 362/72 |
| 5,203,547 | 2/1994 | Leon | 362/72 |
| 5,278,732 | 1/1994 | Francum | 362/72 |
| 5,333,101 | 7/1994 | McEvoy | 362/72 |

Primary Examiner—Richard R. Cole
Attorney, Agent, or Firm—Lowe, Price, LeBlanc & Becker

[57] ABSTRACT

A signal lamp assembly including a casing fixed to the spokes of a bicycle wheel, two tubular, light permeable lampshades connected to two opposite ends of the casing, and a lamp circuit unit installed in the casing and the lampshades and consisting of a battery, a manual switch, a reversing switch, and a series of light emitting diodes disposed in the lampshades and controlled to give light by the manual switch and the reversing switch, wherein the reversing switch is alternatively switched on and off when the bicycle wheel is turned round and round after the manual switch is switched on, causing the light emitting diodes to flash.

5 Claims, 7 Drawing Sheets

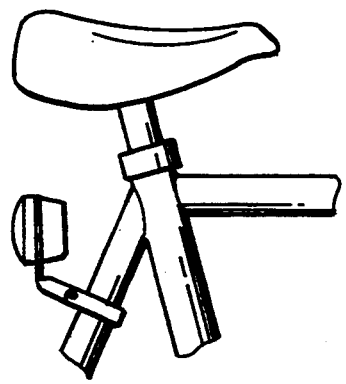
FIG.1 (A) PRIOR ART
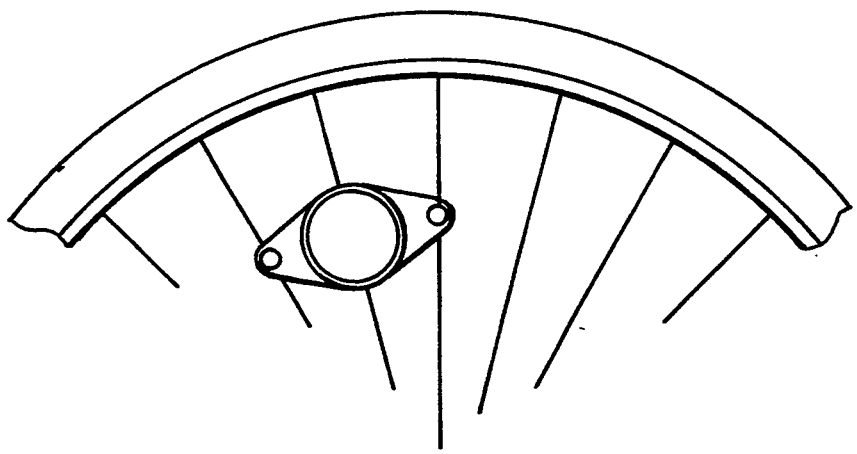
FIG.1 (B) PRIOR ART

SIGNAL LAMP ASSEMBLY FOR BICYCLES

BACKGROUND OF THE INVENTION

The present invention relates to a signal lamp assembly for bicycles which gives a flashing light when it is turned with the bicycle wheel.

Various signal lamp devices are well-known and intensively used with motorcycles. However, few signal lamp devices have been disclosed for bicycles. For a safety riding, a bicycle may be installed with a rear light, as shown in FIG. 1A, or equipped with a reflector, as shown in FIG. 1B. The rear light shown in FIG. 1A can only give a backward beam. The reflector shown in FIG. 1B can only reflect light coming from a limited angle. Therefore, these devices are not satisfactory in function. Furthermore, the rear light shown in FIG. 1A does not produce any lighting effect when it is turned on to give light.

SUMMARY OF THE INVENTION

The present invention provides a signal lamp assembly which can be conveniently fastened to the spokes of a bicycle to give a flashing light when the bicycle runs. The signal lamp assembly comprises a casing having clamping devices for fastening to the spokes of a bicycle, two tubular lampshades fastened to two opposite ends of the casing to hold light emitting diodes, a battery installed in the casing, a manual switch and a reversing switch mounted on the casing for controlling the operation of the light emitting diodes. When the bicycle is running, the reversing switch is alternatively switched on and off, causing the light emitting diodes to flash. When the running speed of the bicycle is increasing, the interval between ON and OFF modes is relatively shortened.

BRIEF DESCRIPTION OF THE DRAWINGS

FIG. 1A shows a rear light mounted on the seat stay of a bicycle for giving a visual warning signal;

FIG. 1B shows a reflector mounted on the spokes of a bicycle for reflecting light;

DETAILED DESCRIPTION OF THE PREFERRED EMBODIMENT

Figure 2:
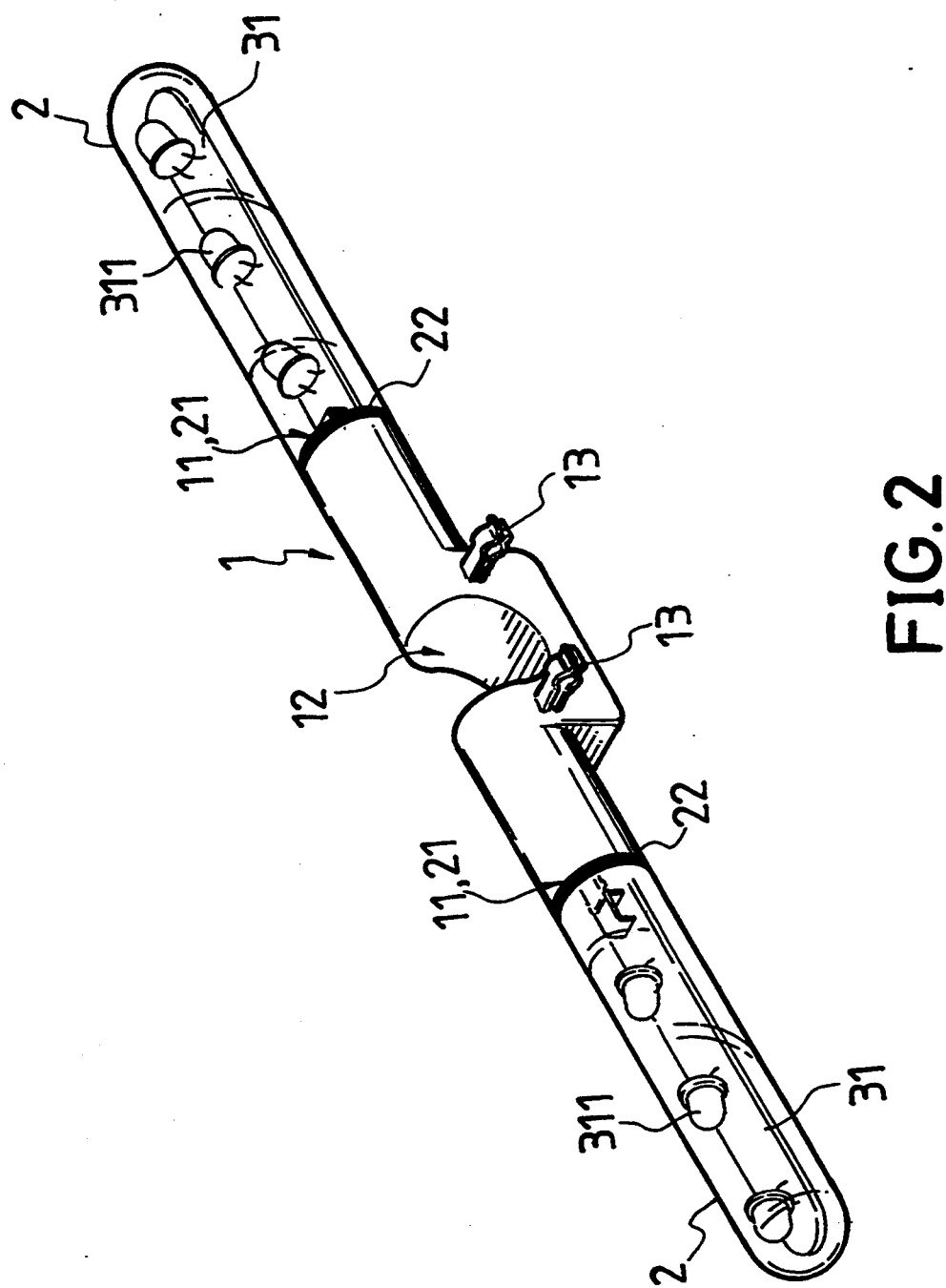
FIG. 2 is a perspective elevation of a signal lamp assembly according to the present invention.

Referring to FIG. 2, a signal lamp assembly in accordance with the present invention is generally comprised of a casing 1, two cylindrical lampshades 2 fastened to two opposite ends of the casing 1, and a lamp circuit unit 3 installed in the casing 1 and the lampshades 2.

Figure 3:
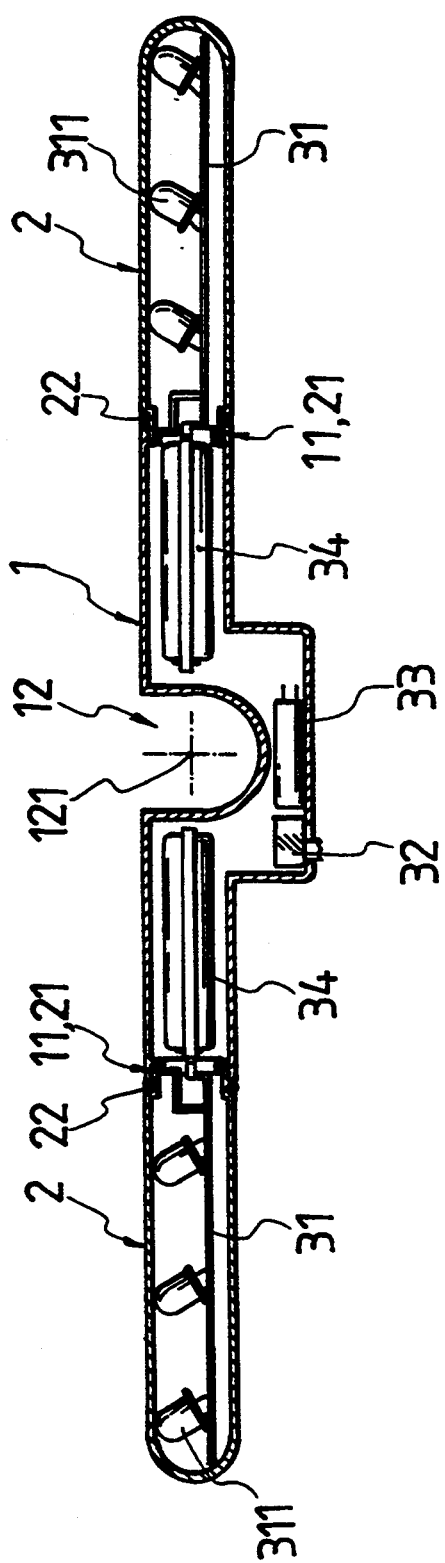
FIG. 3 is a longitudinal view in section of the signal lamp assembly shown in FIG. 2.
Figure 6:
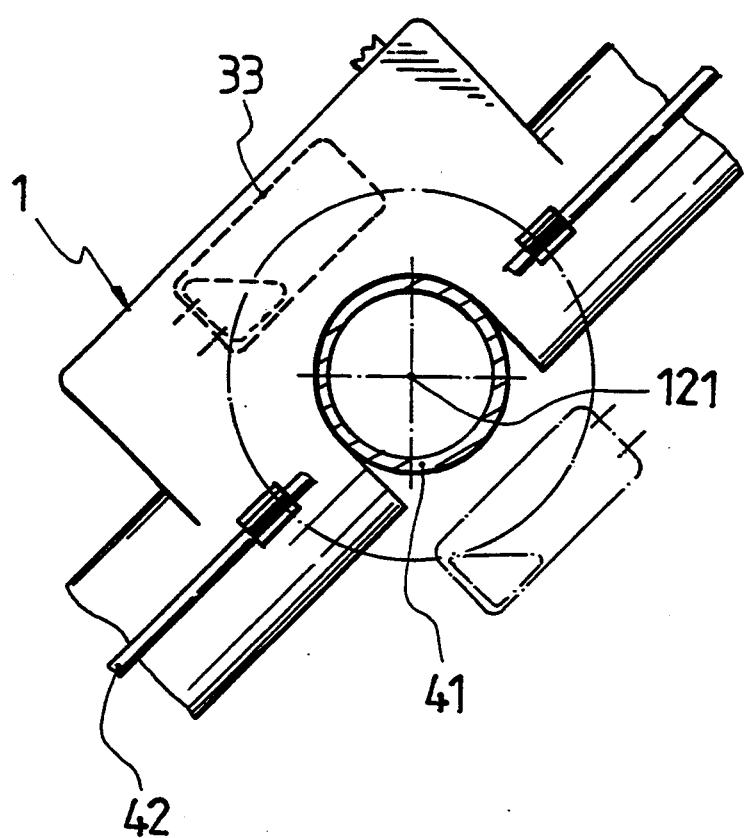
FIG. 6 is a schematic drawing showing the position of the reversing switch relative to the center of rotation according to the present invention.
Figure 7:
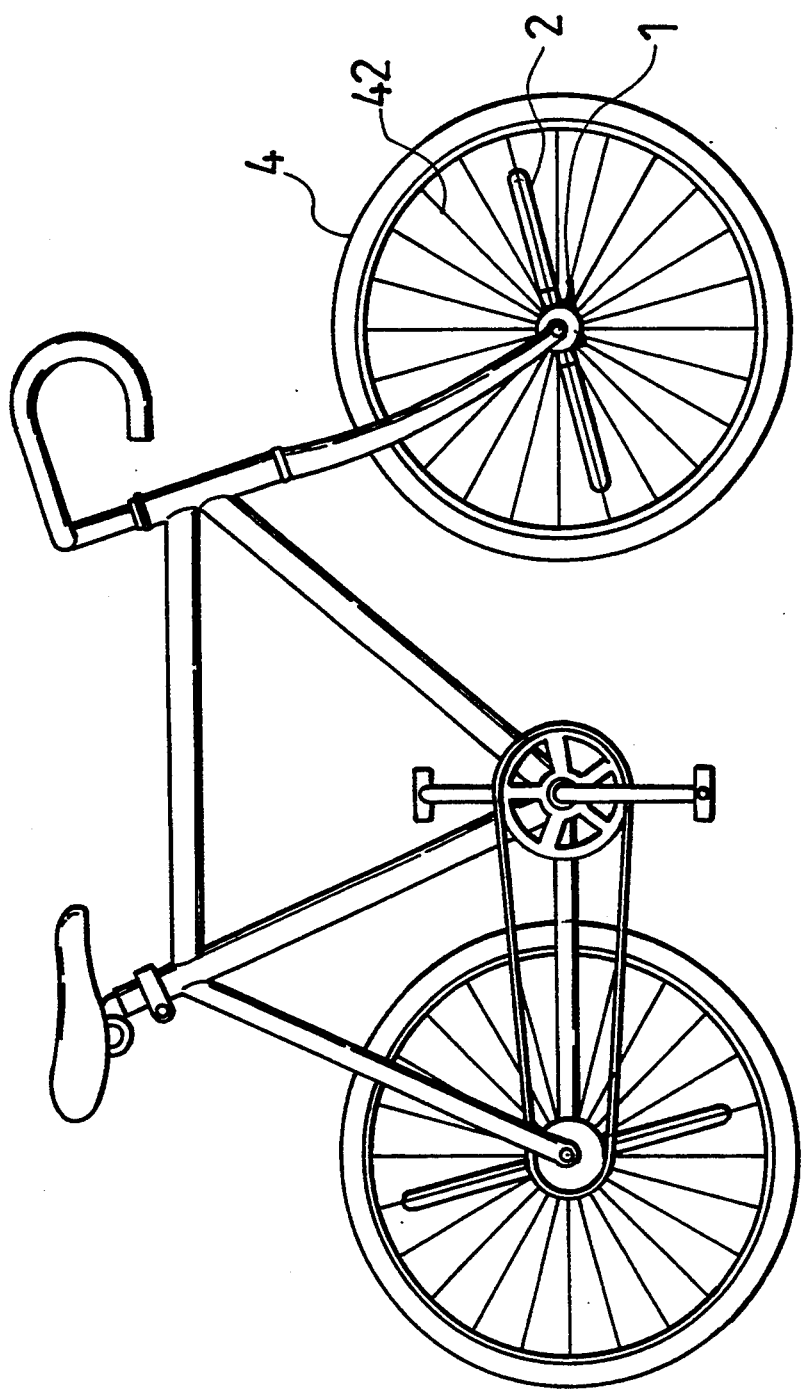
FIG. 7 is an installed view showing the signal lamp assembly of FIG. 2 mounted on a bicycle front wheel.

Referring to FIGS. 3, 6 and 7 and FIG. 2 again, the casing 1 comprises a mounting recess 12 in the middle, which fits the wheel hub 41 of a bicycle wheel 4 (see FIGS. 6 and 7), defining a center of rotation 121. Two clamping devices 13 are made on the casing 1 at one side for fastening the casing 1 to the spokes 42 of the bicycle wheel 4.

Referring to FIGS. 2 and 3 again, the lampshades 2 are molded from light permeable material such as transparent plastics, each having an open end 21 connected to one end 11 of the casing 1. As illustrated, the open end 21 of each lampshade 2 is respectively fastened to the two opposite ends 11 of the casing 1 by a respective screw joint. Water sealing rings 22 are mounted around the connecting area between the open ends 21 of the lampshades 2 and the two opposite ends 11 of the casing 1.

Referring to FIG. 3 again, the lamp circuit unit 3 comprises two circuit boards 31, a main switch 32, a rotary switch 33, and a battery 34 respectively connected in series. The circuit boards 31 are respectively mounted inside the lampshades 2, each comprised of a plurality of light emitting diodes 311 connected in series. The main switch 32, the reversing switch 33 and the battery 34 are mounted inside the casing 1. However, the main switch 32 can be controlled from the outside.

Figure 4:
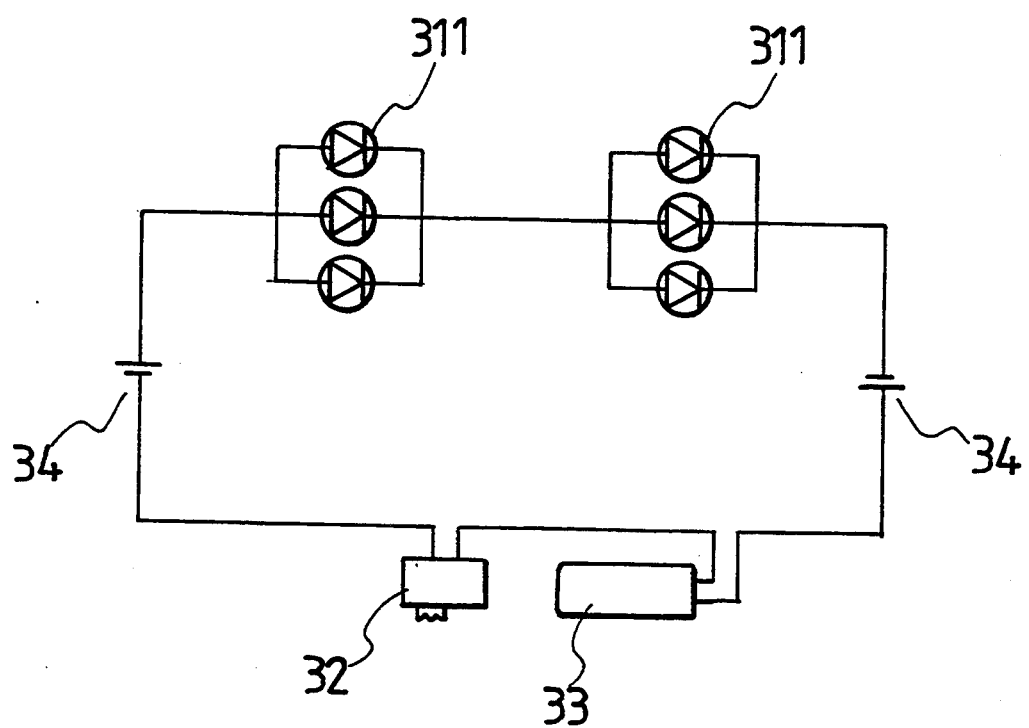
FIG. 4 is a circuit diagram of the lamp circuit unit for the signal lamp assembly shown in FIG. 2.

Referring to FIG. 4, the battery 34 provides the necessary working power to the light emitting diodes 311. However, the circuit between the battery 34 and the light emitting diodes 311 is controlled by the main switch 32 and the reversing switch 33. The light emitting diodes 311 are electrically connected to the battery 34 only when the main switch 32 and the reversing switch 33 are simultaneously switched on. The main switch 32 is a manual switch controlled by the user. The reversing switch 33 can be switched on/off by changing its angle of inclination.

Figure 5:
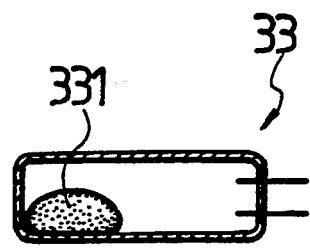
FIG. 5A shows one embodiment of the reversing switch for the signal lamp assembly shown in FIG. 2.
FIG. 5B shows a second embodiment of the reversing switch for the signal lamp assembly shown in FIG. 2.
FIG. 5C shows a third embodiment of the reversing switch for the signal lamp assembly shown in FIG. 2.
Figure 5:
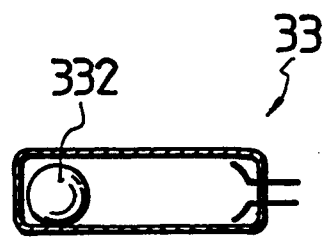
Figure 5:
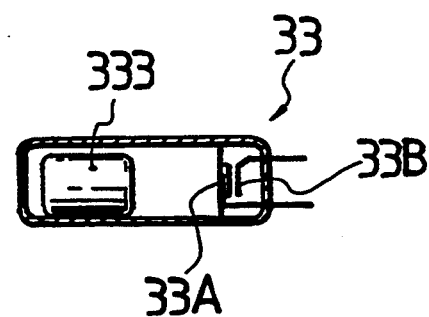

The aforesaid reversing switch may be variously embodied. FIG. 5A shows one embodiment of the reversing switch 33, which comprises a liquid metal 331 moved between two opposite ends thereof (the reversing switch of this embodiment has two opposite contacts spaced at one end, which will be electrically connected when the liquid metal is moved to one end of the switch or electrically disconnected when the liquid metal is moved to the other end). FIG. 5B shows another alternate form of the reversing switch 33, which comprises a contact metal ball 332 moved between two opposite ends thereof. FIG. 5C shows still another alternate form of the reversing switch 33, which comprises two contact metal springs 33A and 33B spaced at one side, and a magnet 333 moved relative to the contact metal springs 33A and 33B. When the magnet 333 is moved toward the contact metal springs 33A and 33B, the contact metal springs 33A and 33B will be attracted to the magnet 333, causing the reversing switch 33 switched on. On the contrary, when the magnet 333 is moved away from the contact metal springs 33A and 33B, the contact metal springs 33A and 33B are disconnected from each other, causing the reversing switch 33 switched off.

Referring to FIG. 6 again, when the casing 1 of the signal lamp assembly is fastened to the wheel hub 41 and spokes 42 of a bicycle wheel, the signal lamp assembly can be turned with the bicycle wheel around the center of rotation 121. When the signal lamp assembly is turned around the center of rotation 121, the reversing switch 33 is alternatively switched on and off, causing the light emitting diodes 311 to flash. The installation position of the reversing switch 33 must not pass the center of rotation 121 or the radial direction through the center of rotation 121, so as to prevent from normal open or normal close of the reversing switch 33 due to the effect of centrifugal force.

FIG. 7 shows the signal lamp assembly mounted on the spokes 42 of the front wheel 4 of a bicycle. When the bicycle runs, the signal lamp assembly is turned round and round, causing the light emitting diodes 311 to flash. The flashing frequency of the light emitting diodes 311 is direct proportional to the running speed of the bicycle. Therefore, when the bicycle is moving at a high speed, a ring of light will be presented at the front wheel 4 to give a visual warning and simultaneously to produce an attractive lighting effect.

As indicated, the present invention may be variously embodied. Recognizing that various modifications and changes are apparent, the scope herein shall be deemed as defined in the claims set hereinafter.

What is claimed is:

1. A signal lamp assembly comprising:
   a hollow casing fixed to a bicycle wheel, said casing comprising a mounting recess, which receives a wheel hub of the bicycle wheel, and fastening means, which secures said casing to the spokes of the bicycle wheel;
   two tubular, light permeable lampshades connected to two opposite ends of said hollow casing;
   a lamp circuit unit installed in said casing and said lampshades, said lamp circuit unit comprising a battery power supply, a manual switch, a reversing switch, and a plurality of light emitting diodes disposed in said lampshades and connected in series to said battery power supply through said manual switch and said reversing switch, and
   wherein said reversing switch is alternatively switched on and off when the bicycle wheel is turned round and round after said manual switch is switched on, causing said light emitting diodes to flash.

2. The signal lamp assembly of claim 1 wherein said reversing switch comprises a liquid metal inside moved between a closed position to switch on said reversing switch and an open position to switch off said reversing switch.

3. The signal lamp assembly of claim 1 wherein said reversing switch comprises a contact metal ball moved between a closed position to switch on said reversing switch and an open position to switch off said reversing switch.

4. The signal lamp assembly of claim 1 wherein said reversing switch comprises two contact metal springs spaced at one side and respectively connected to two opposite terminals of said battery power supply, and a magnet moved between a closed position to attract said contact metal springs causing them electrically connected, and an open position to release said contact metal springs causing them electrically disconnected.

5. The signal lamp assembly of claim 1 wherein said lampshades are respectively fastened to the two opposite ends of said casing by respective screw joints and respectively sealed by a respective water sealing ring.

* * * * *